INVENTORS
STEPHEN R. HUBBARD,
CARL W. CHANLUND,
BY Lyon & Lyon
ATTORNEYS

Feb. 11, 1958 S. R. HUBBARD ET AL 2,822,989
MEANS FOR PRESTRESSING CONCRETE PIPE
Filed Feb. 15, 1954 9 Sheets-Sheet 8

INVENTORS
STEPHEN R. HUBBARD,
CARL W. CHANLUND,
BY
Lyon & Lyon
ATTORNEYS

FIG. 22.

United States Patent Office 2,822,989
Patented Feb. 11, 1958

2,822,989

MEANS FOR PRESTRESSING CONCRETE PIPE

Stephen R. Hubbard and Carl W. Chanlund, Nampa, Idaho, assignors, by mesne assignments, to Cen-Vi-Ro Pipe Corporation, South Gate, Calif., a corporation of Delaware Application February 15, 1954, Serial No. 410,401

12 Claims. (Cl. 242—7)

This invention relates to the manufacture of prestressed concrete pipe. When concrete pipe is used as a conduit for fluids under pressure and particularly under pressures approaching or exceeding 100 lbs. per square inch, it is necessary to place the concrete in compression prior to the application of the internal pressure to which the pipe is ultimately intended to be subjected. This is done by wrapping the pipe with steel wire which is applied under tension so as to place the concrete in compression. When internal pressure is applied to the pipe, the resulting radial forces must overcome the compression which has been induced into the concrete to bring the concrete to a state of zero compression before the concrete can be expected to fail in tension as it would in an ordinary pipe. It is common in the field to use the zero compression point as a design criterion for the static head the pipe will withstand.

It is accordingly one object of this invention to provide a means of prestressing concrete pipe to place the concrete under compression.

It is a further object of this invention to provide means for winding wire under tension upon concrete pipe.

It is a further object of this invention to provide such a means in which the lead or pitch of the wire being wound upon the concrete pipe can be set to remain uniform, can be varied at will and once set will remain constant despite the speed of rotation of the pipe.

It is a further object of this invention to provide means for maintaining the wire being wound upon the pipe at a constant tension, which tension is however variable at will by the operator.

It is a feature of this invention that it employs a cascade arrangement of electromotors and eddy current coupling clutches such that the motor and clutch associated with the drive mechanism for rotating the pipe acts as a master to a slave motor which controls the lead or pitch of the wire so that when the ratio of the first motor to the second motor is once set, the same ratio will be maintained despite the speed of the master motor.

It is a further feature of this invention that such an eddy current clutch is used in novel arrangement to maintain a constant, but variable at will, tension upon the wire being wound upon the pipe.

It is a further feature of this invention that novel means are provided for cutting a spiral step to accommodate the wire being wound upon the bevelled end of the pipe, the pitch of which spiral step is directly controlled by the wire itself and it is thus made to conform to the pitch of the wire.

These and other objects, features and advantages of the present invention will be apparent from the annexed specification in which.

Figure 1:
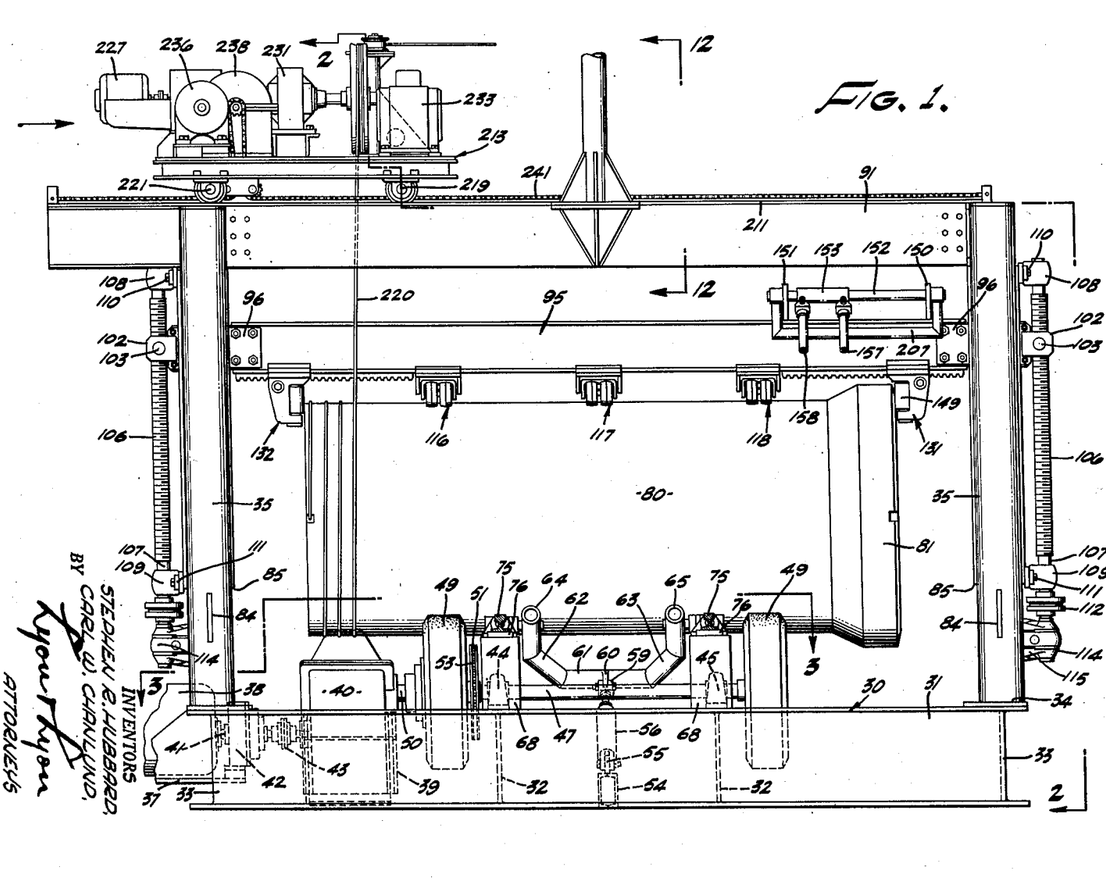
Figure 1 is a side elevation of a device embodying the present invention.
Figure 2:
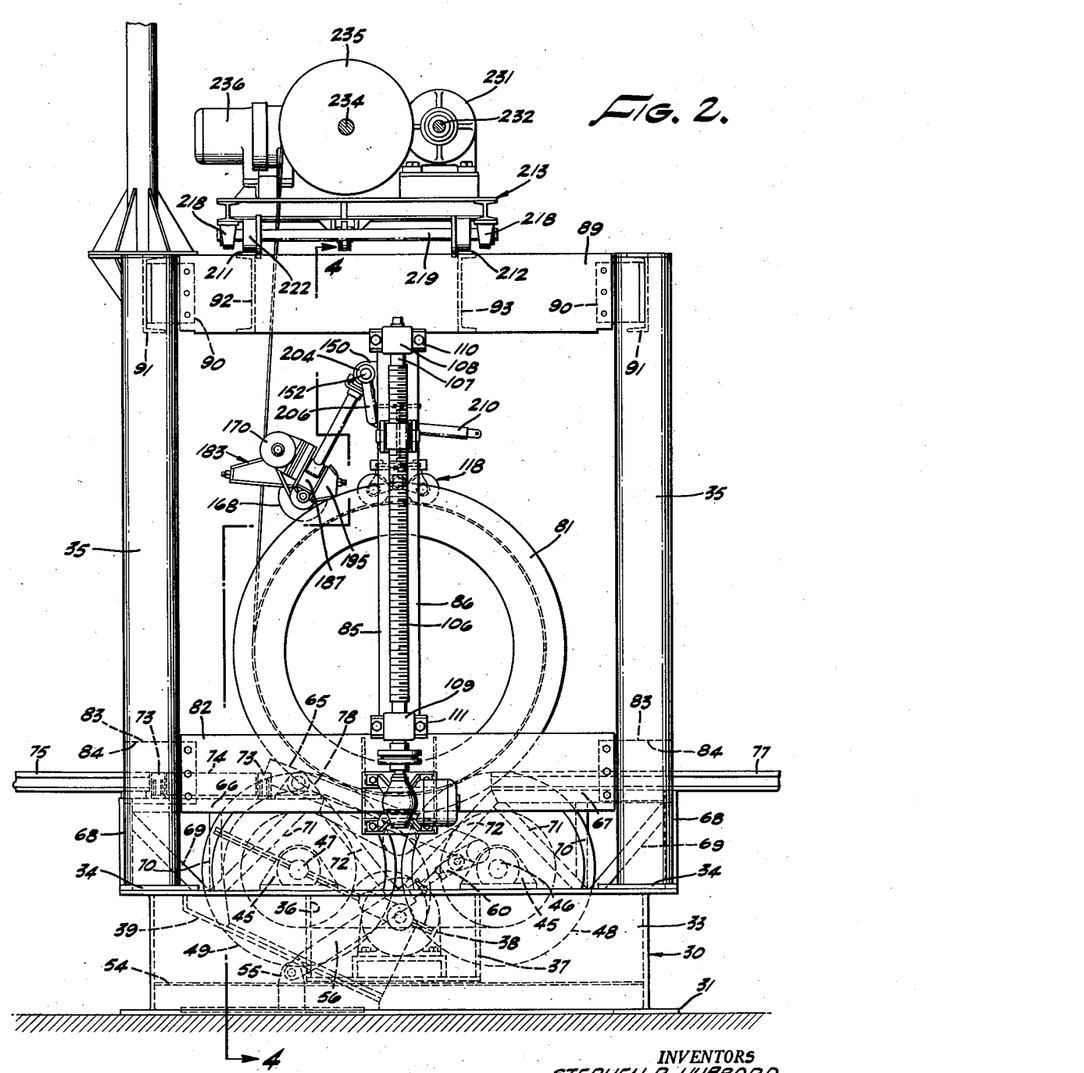
Figure 2 is a section taken on the line 2—2 of Figure 1.
Figure 3:
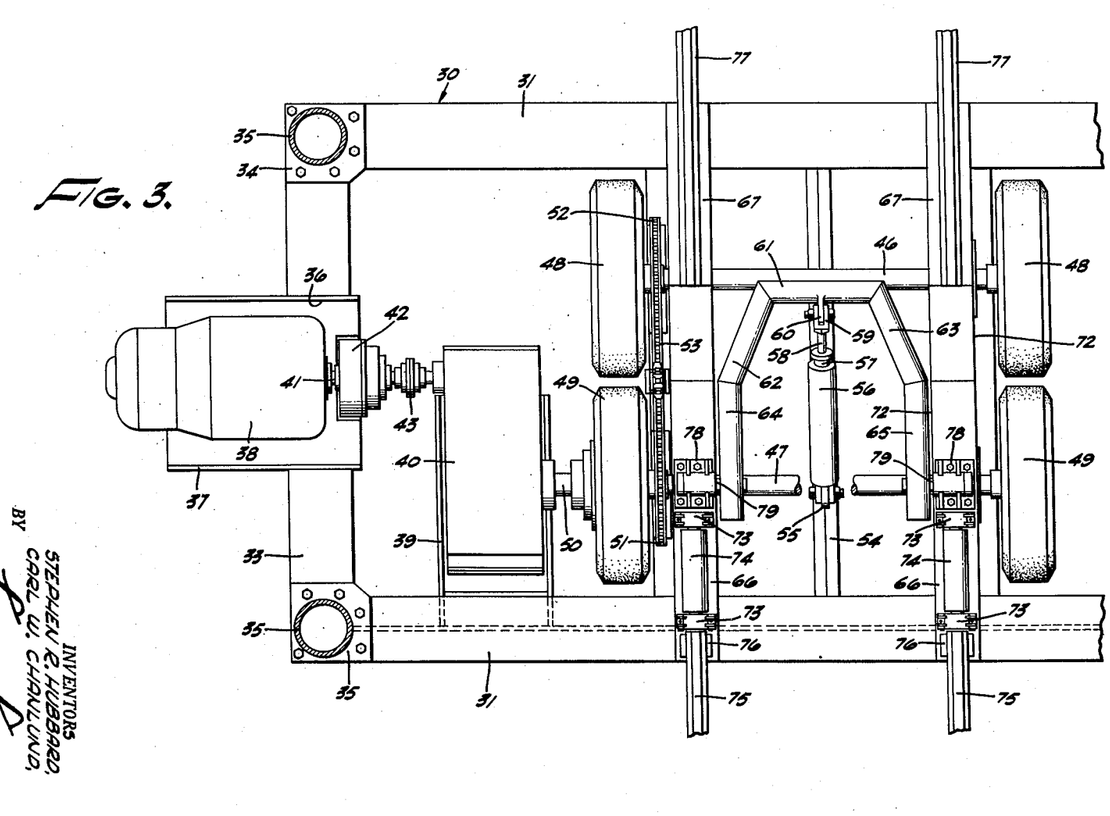
Figure 3 is a section taken on the line 3—3 of Figure 1.

Referring now more particularly to the drawings and particularly to Figures 1 and 2, the device is illustrated as comprising a base 30 formed of two spaced beams, each comprising a plurality of longitudinal wide-flange beams 31, joined to cross pieces 32, also in the form of wide-flange beams, and end pieces 33, also in the form of wide-flange beams. Mounting pads 34 are placed at the four corners of the base 30 and mount upstanding tubular columns 35. The left end piece (as shown in Figure 1) 33 is cut away as at 36 (Fig. 3), and a mounting pad 37 is provided therein to form a support for a 50-horsepower electromotor 38. A framework 39 forming a housing is attached to the frame 30 as indicated in Figures 1 and 3 and houses a gear reducer box 40. The housing of the motor 38 includes an eddy current coupling connecting the same to a shaft 41 which is operably connected to a brake 42 which is in turn connected by the coupling 43 to the gear reducer box 40. A pair of spaced bearings 44 is mounted upon the top of one cross piece 32, and a similar pair of spaced bearings 45 is mounted upon the other cross piece 32, in which spaced bearings are journalled shafts 46 and 47 upon which are mounted rubber trunnions 48 and 49. A shaft 50 connects the gear reducer box 40 to one of the journalled shafts 47 as shown, and a sprocket wheel 51 is carried by the shaft 47, and a similar sprocket wheel 52 is carried by shaft 46, and an endless chain 53 connects the two sprocket wheels as shown. It will thus be apparent that when the motor is energized, the rubber trunnions 48 and 49 will be driven.

Boxed channels 54 are mounted between the two side members centrally thereof and extend across the frame. Pivoted to an eye member 55, which is mounted upon the box section 54, is a hydraulic cylinder 56. Piston 57 of the hydraulic cylinder 56 is connected to a shaft 58 which is pivotally connected as at 59 to an eye member 60 connected to a tube 61. The tube 61 is welded to a pair of tubes 62 and 63 which are in turn welded to a pair of tubes 64 and 65. A pair of channels 66 and 67 is supported upon channel 68, diagonal channel 69, vertical channel 70, diagonal channel 71 and convergent diagonal channel 72. It will be understood that there are two pairs of channels 66 and 67 and two pairs of associated truss work, each mounted directly above the cross pieces 32. Each channel 66 mounts a pair of spaced bearings 73 in which are journalled the reduced ends of a roller 74. A pair of rails 75 is provided in alignment with each of the rollers 74. The rails 75 are mounted on pads 76 carried by the channel 68. Each channel 67 mounts a rail 77, the rail 77 being in alignment with the roller 74 and rail 75.

Each channel 66 also supports a bearing member 78, and in each of the bearings 78 there is journalled a shaft 79, and each of the shafts 79 is respectively fixedly connected to one of the tubes 64 or 65.

Referring to Figure 1, it will be noted that a section of concrete pipe 80 having a bell end 81 is mounted upon trunnions 48 and 49. To place pipe sections 80 in place upon the trunnions, the sections of pipe are first loaded upon the rail 75 and rolled thereon to the rollers 74. When in place upon the rollers 74, the pipe sections can be rolled to the right or left as shown in Figures 1 and 3 to properly align them longitudinally of the machine. When properly aligned longitudinally of the machine, the pipe sections are rolled past the roller 74 onto the tubes 64, 65, 63 and 62. The hydraulic cylinder 56 is then actuated to pull the piston 57 down into the cylinder 56 and thus gently lower the pipe on the trunnions.

A channel 82 is bolted to a plate 83 which is welded in slots 84 in the tubular columns 35 so that the channel 82 extends from one end column 35 to the other end column 35. It will be appreciated that there is such a channel 82 mounted between each pair of end columns 35. A pair of channels 85 and 86 is provided at each end of the machine, each disposed back-to-back and receiving between the webs thereof, and attaching thereto by bolts, plates 87 which are welded to the channel 82. At their upper ends, channels 85 and 86 are bolted to plates 88 which are in turn welded to channels 89. Channels 89 are in turn bolted to plate 90, which plates are bolted to channels 91 which form the longitudinal top pieces of the frame. There are thus two spaced channels 91 connected at their ends by the two channels 89 and intermediate their ends by spaced channels 92 and 93.

Figures 5, 6:
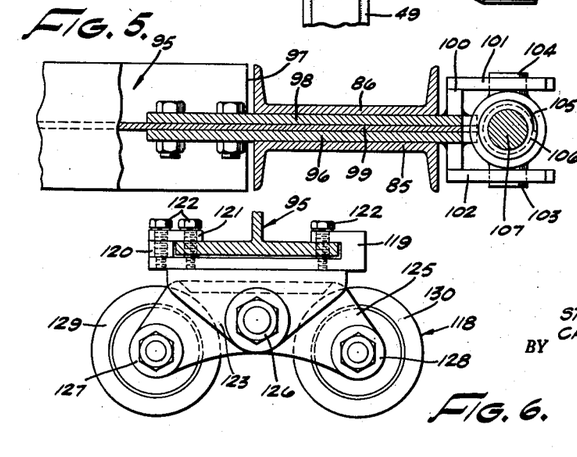
Figure 5 is a section taken on the line 5—5 of Figure 4.
Figure 6 is a section taken on the line 6—6 of Figure 4.

A wide-flange beam 95 is provided having the upper and lower flanges thereof cut away as at 97, and a pair of plates 96 and 98 is bolted to the web 99 of the wide-flange beam, as most clearly shown in Figure 5. The plates 96 and 98 and associated web 99 extend between the two channels 85 and 86 and are welded to the cross member 100 of a yoke having two arms 101 and 102 which are bored to pivotally receive bosses 103 and 104 on an internally threaded collar 105. It will thus be seen that each end of the wide-flange beam 95 is slidably received between the two pairs of upstanding spaced channels 85 and 86 and at its ends supports a self-aligning collar 105. Each collar 105 receives a threaded lead screw 106 on a shaft 107, and each shaft 107 is supported by a pair of spaced bearings 108 and 109 bolted to the channels 85 and 86 as shown at 110 and 111. Each shaft 107 also carries a friction clutch 112 which is in turn attached to a shaft 113 of an electromotor 114 mounted by a bracket 115 to the channel 82.

From the foregoing description, it will be apparent that when the two electromotors 114 are jointly energized, the lead screws 106 will be revolved thus causing the wide-flange beam 95 to be raised or lowered.

Figure 4:
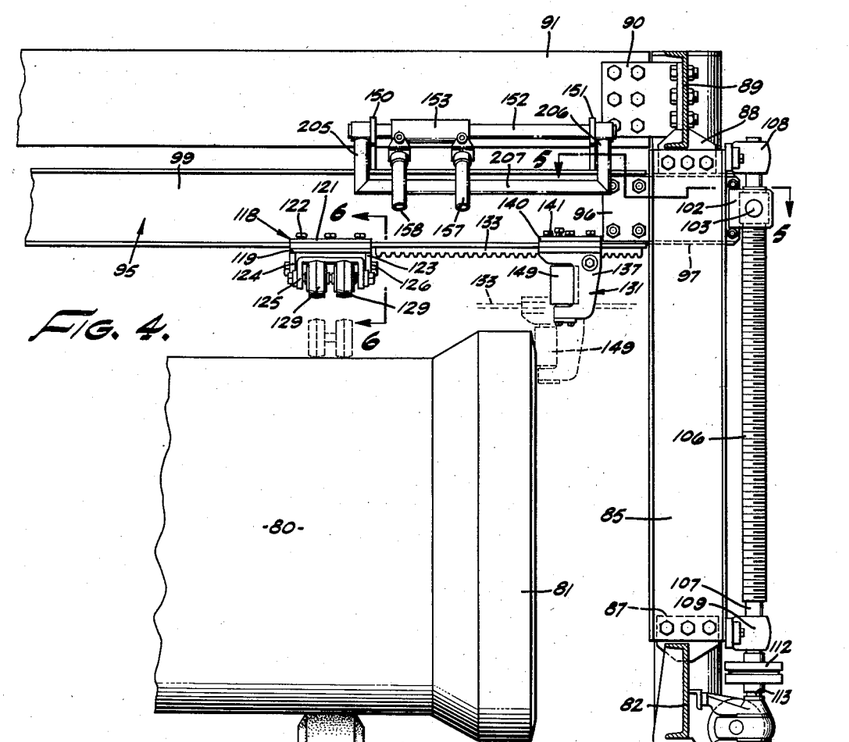
Figure 4 is a section taken on the line 4—4 of Figure 2.

Mounted upon the lower flange of the wide-flange beam 95 are three roller assemblies 116, 117 and 118. As these assemblies are identical, only one, number 118, will be described in detail. Referring to Figures 4 and 6, it will be noted that the roller assembly comprises a J-shaped plate 119, a spacer 120 and plate 121 secured to the flange of the wide-flange beam 95 by bolts 122. The plate 119 is provided with a pair of depending flanges 123 and 124, and a U-shaped member 125 is secured therein by means of bolts 126. The U-shaped member on each of its legs is provided with extensions 127 and 128 between which are mounted pairs of rollers 129 and 130.

Figures 7, 8, 9:
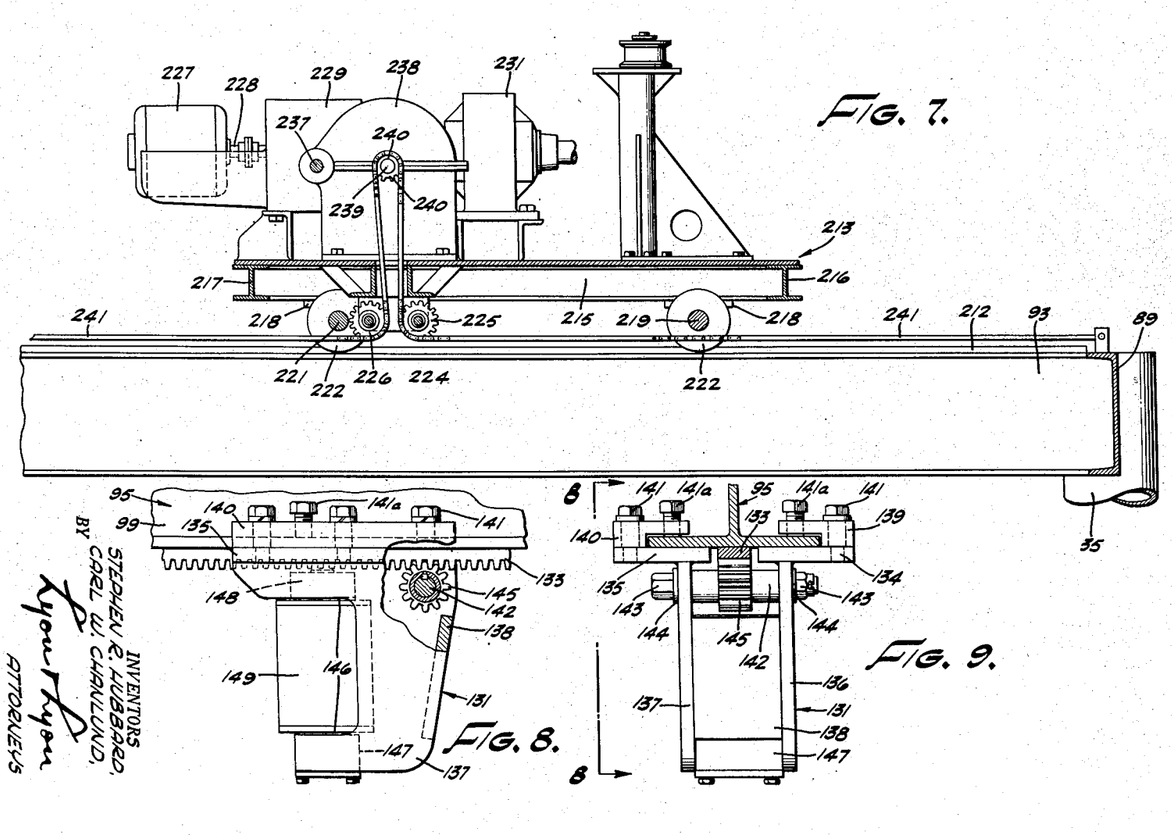
Figure 7 is an enlarged fragmentary side elevation showing the wire tensioning and leading mechanism.
Figure 8 is a fragmentary section taken on the line 8—8 of Figure 9.
Figure 9 is a fragmentary section taken on the line 9—9 of Figure 10.
Figure 10:
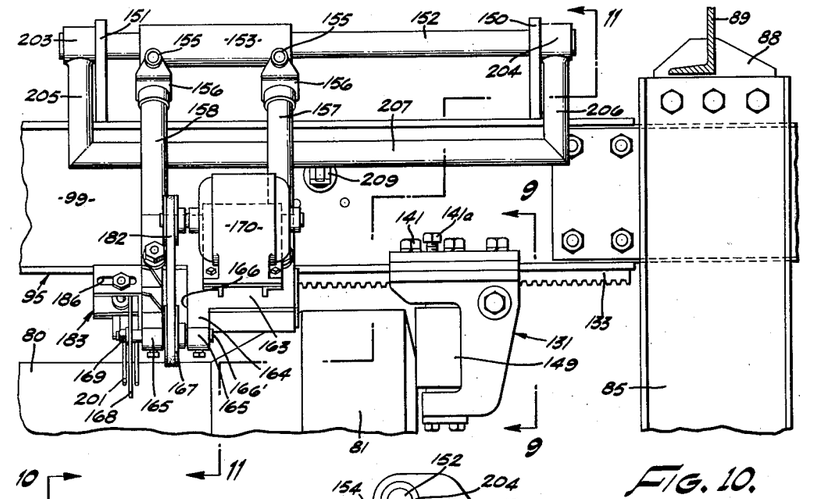
Figure 10 is a fragmentary elevation taken on the line 10—10 of Figure 11.

Referring now particularly to Figures 4, 8 and 9, there is illustrated an end roller assembly 131. It will be noted from Figure 1 that a similar end roller assembly 132 is provided at the other end, but as the same is identical to the assembly 131, the latter only will be described in detail. Affixed to the underside of the wide-flange beam 95 is a rack 133. A supporting frame comprising a pair of plates 134 and 135, a pair of side plates 136 and 137 welded thereto, a connecting member 138 and L-shaped members 139 and 140 are secured to the flange of the wide-flange beam 95 by means of bolts 141. A shaft 142 is journalled in holes in the side plates 136 and 137 and fixedly secured thereto by means of nuts 143 and washers 144. The shaft 142 at the center thereof mounts a pinion 145. The plates 136 and 137 are cut away as at 146, and between the plates 136 and 137 there are mounted bearings 147 and 148 for a shaft on which is mounted a vertically extending roller 149.

It will be appreciated from the foregoing description that on loosening of the bolts 141a and the turning of the shaft 142 the roller assembly can be positioned as desired with respect to the rack 133 so as to bring the roller into contacting position with the end bell 81 of the pipe 80. Similarly, the roller assembly 132 may be positioned if desired with respect to the other end of the pipe 80.

It will be further appreciated that on energization of the motors 114 to drive the lead screws 106, the wide-flange beam 95 and all the associated mechanism will be raised or lowered thus moving the rollers 129 and 149 from the position shown in full lines in Figure 4 to the position shown in phantom or the operating position.

Referring now more particularly to Figures 10, 11, 13, 14, 15 and 16, there is shown a saw assembly mounted upon the wide-flange beam 95 and including a pair of upstanding plates 150 and 151 mounted on the upper flange of the wide-flange beam 95 and having a shaft 152 supported therebetween. The tubular sleeve 153 surrounds the shaft 152 and has a sliding fit thereon. The sleeve 153 carries a pair of drilled bosses 154 to receive pins mounted in fork members 155 of clevis 156, which clevis mounts tubular shafts 157 and 158, each of which has at its lower end a bearing member 159. Each bearing member 159 receives a bolt 160 and a nut 161 by means of which plates 162 and 163 are secured between the two shafts 157 and 158. The plates 162 and 163 are recessed as at 166, and the divided ends 164 of the plate 163 are bent downward to retain spaced bushing 165. A shaft 166' is mounted in the bushings and mounts a pulley 167 in the openings 166, and a circular saw 168 is retained upon the end thereof by a nut 169. An electric motor 170 is mounted upon angle irons 180 and 181 mounted upon the plate 163 and through a belt 182 drives the pulley 167, the shaft 166' and the saw 168. A bracket indicated generally by the numeral 183 and comprising a plate having a generally triangular shaped portion 184, a bent-over end piece 185 provided with a slot 186, a rectangular portion 187, a trapezoidal portion 195 and a bent-over bottom portion 188 provided with an open slot 189 reinforced by a pair of gussets 190 and 191 removably supports a rod 192 secured in the slots 186 and 189 by nuts 193 and 194. Stiffening members or gussets 196 and 197 reinforce the portion 184 while gussets 198, 199 and 200 reinforce the portion 195. A pair of removable fingers 201 are mounted in a retainer 202 mounted on a portion of the bent-over portion 188 and serve to regulate the depth of the cut made by the saw blade 168.

The shaft 152 on its free ends carries a pair of collars 203 and 204 in which are mounted rods 205 and 206 joined at their ends by a rod 207. The rod 207 adjacent the midpoint thereof carries a link 208 connected to the piston 209 of a hydraulic cylinder 210 mounted upon the web of the wide-flange beam 95 in alignment with an aperture (not shown) therein. It will be appreciated that upon energizing of the hydraulic cylinder 210 to expel the piston 209, the rods 205, 206 and 207 will be swung upwardly until the rod 207 contacts the shafts 157 and 158 and thus raises the saw 168 from contact with the pipe 80.

Figure 11:
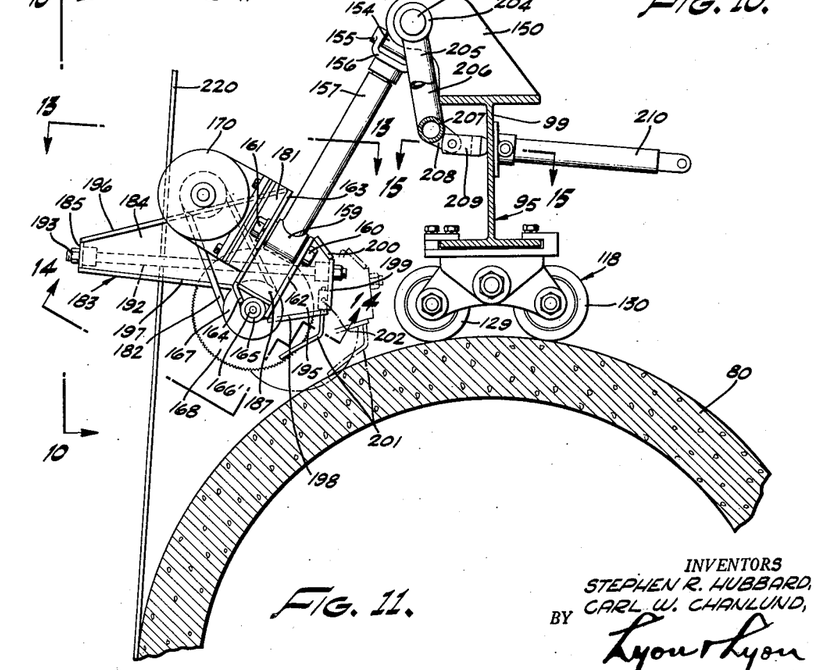
Figure 11 is a section taken on the line 11—11 of Figure 10.
Figure 12:
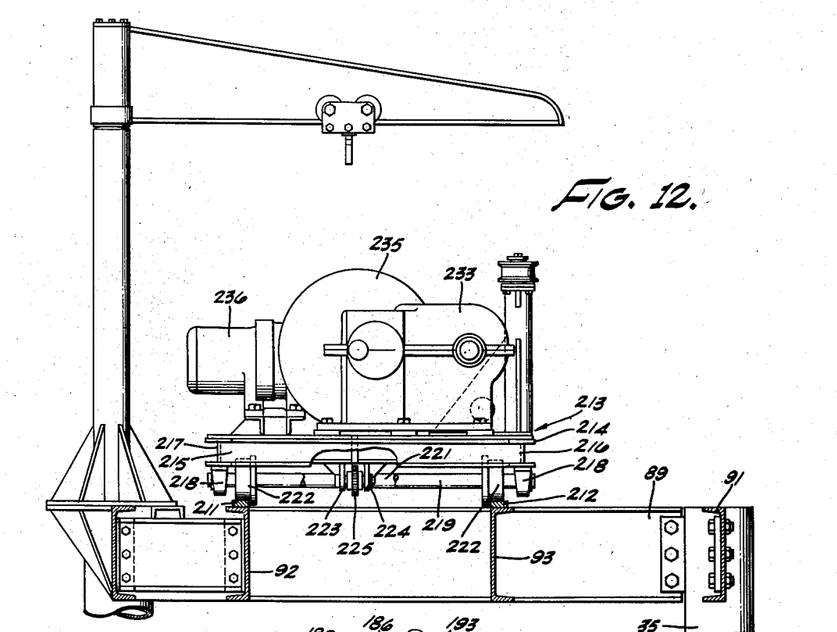
Figure 12 is an enlarged fragmentary side elevation partly in section taken on the line 12—12 of Figure 1.
Figures 13, 14, 16:
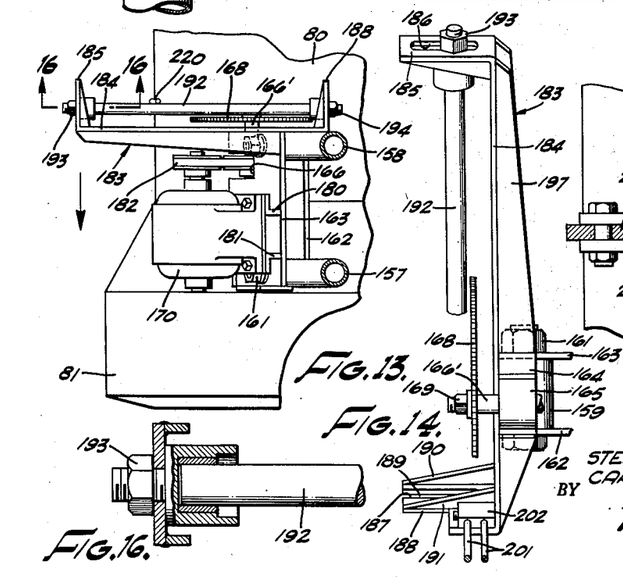
Figure 13 is a section taken on the line 13—13 of Figure 11.
Figure 14 is a section taken on the line 14—14 of Figure 11.
Figure 16 is a section taken on the line 16—16 of Figure 13.
Figure 15:
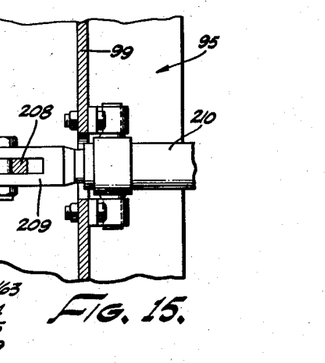
Figure 15 is a section taken on the line 15—15 of Figure 11.
Figure 17:
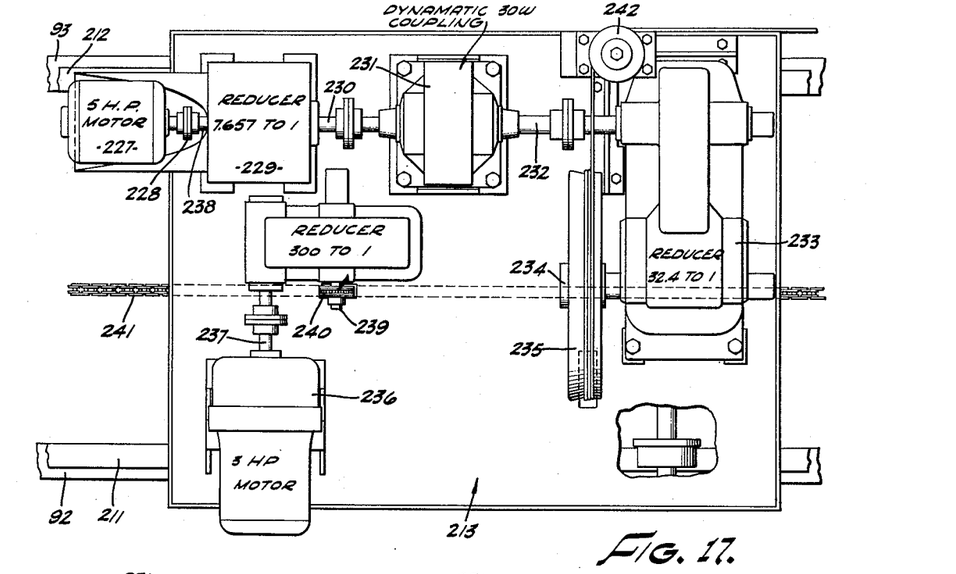
Figure 17 is a plan view of the wire tensioning and leading mechanism.

A wire 220 is wound about the pipe 80, as hereinafter described, with a controlled lead, and as the wire approaches the bell end 81 of the pipe 80, the saw 168 is lowered into contact with the bell end 81 and the saw is driven by the electromotor 170. In order to cause the saw 168 to grind a helical ridge on the inclined surface of the bell end 81, the saw is advanced by the advancing wire 220 contacting the rod 192 as shown in Figures 11 and 13 thus causing the sleeve 153 to slide upon the rod 152 and move the entire saw assembly to the right. The saw is thus advanced at the same rate as the wire 220.

Mounted directly on top of the longitudinal members 92 and 93 is a pair of rails 211 and 212. Adapted to run upon the rails 211 and 212 is a cart 213 comprising a plate 214 mounted on peripheral wide-flange beams 215, 216 and 217 to which are attached axle bearings 218 in which is journalled a pair of axles 219 and 221, each of which mounts a pair of flanged wheels 222 adapted to ride upon the rails 211 and 212. Mounted to the underside of the cart by means of spaced frame members 223 and 224 is a pair of idler sprockets 225 and 226. Mounted on top of the cart is a 5-horsepower electromotor 227 driving a shaft 228 connected to a gear reducer 229 which is in turn connected by a shaft 230 to an eddy current clutch 231 which is in turn connected to a shaft 232 of a gear reducer 233 which also has a shaft 234 on which is mounted a capstan 235. The clutch 231 is of the slip type and can be used to drive the shaft 232, if desired, or to provide torque opposing rotation of said shaft, as when the capstan 235 is being rotated by the pipe pulling wire therefrom during a pipe wrapping operation. In this way, the tension in the wire can be controlled by resisting rotation of the capstan 235 through the slip clutch 231 and shaft 232. Also mounted on the cart 213 is a 3-horsepower electromotor and clutch 236 driving a shaft 237 connected to a gear reducer 238 driving a shaft 239 on which is mounted a pinion 240. The chain 241 is affixed at its ends to opposite sides of the main frame and, as shown in Figure 7, the chain passes around the idler sprocket 225 over the pinion 240 and down around the idler sprocket 226. Thus on energization of the electromotor 236 to drive the pinion 240, the cart will be caused to travel backwards or forwards on the rails 211 and 212. The capstan 235 receives wire from a spool (not shown) around a direction-changing wheel 242 and the wire is wound for several turns about the capstan 235 and is thence passed to the concrete pipe 80 to which the free end is connected.

The electromotor 236 is an Adjusto-Spede motor of a type in which the clutch excitation controls the output shaft speed. The motor 38 is also an Adjusto-Spede motor, and the clutch excitation of the motor 236 varies in a ratio proportionate to that of the motor 38. This is known as a cascade arrangement in which the large motor is the master and the small motor is the slave. Thus, for any fixed speed for the motor 38, it is possible to obtain another fixed speed for the motor 236. Thus a constant ratio between the two can be maintained. The ratio for the motors is simply set by two potentiometers under the control of the operator and the cart is thus advanced at a rate which gives any desired lead to the wire being wound upon the pipe 80.

In order to wind the wire 220 on the pipe 80 under the desired tension, the wire, as pointed out above, is wound around the capstan 235 for five or six turns to develop the necessary holding friction. The free end of the wire is attached to the pipe and the other end to the spool of wire (not shown). As the pipe is rotated, the wire is continuously unwound from the capstan 235 and causes turning of the low speed shaft 234 of the gear reducer 223. The speed of the high speed shaft 232 of the gear reducer 233 is 32.4 times that of the speed of the shaft 234 of said reducer, and since the clutch 231 is a water-cooled eddy current slip clutch, the member of the eddy current coupling on the shaft 232 is rotated at the high speed rate of the gear reducer. By increasing or decreasing the field excitation in the clutch 231 under the control of the operator by means of a simple potentiometer 231e, Fig. 18, the retarding action on the wire, or the wire tension, may be correspondingly varied.

When the pipe is stopped, it is desirable to maintain tension on the wire until it is secured at the termination of the wrapping. If it were not for the motor 227 and the gear reducer 229, there would be no slip in the clutch 231 when the wire was not in motion. Hence it would be impossible to maintain tension. The motor 227 rotates the attached member of the clutch 231 at all times in a direction opposite to the direction in which it tends to be rotated by the magnetic couple with the clutch member on the shaft 232 as rotation is imparted to the latter through the gear reducer 233 by the wire. Therefore, there is always a slip within the clutch which allows it to develop tension on the wire regardless of the speed of the rotation of the pipe. It will be noted that the motor 227 and gear reducer 229 are essential features to maintain tension on the wire when the pipe is rotating at very low speed or when it is at a standstill. The maintenance of constant tension in the wire is facilitated when the pipe 80 is at a standstill by applying the brake 42 to hold the rubber trunnions or drive wheels 48 and 49 stationary so that the friction between the pipe and wheels will hold the pipe stationary and overcome the tendency of the tension force in the wire to turn the pipe backward and thereby avoid unwinding of the wire from the pipe.

Figures 18, 19, 20, 21:
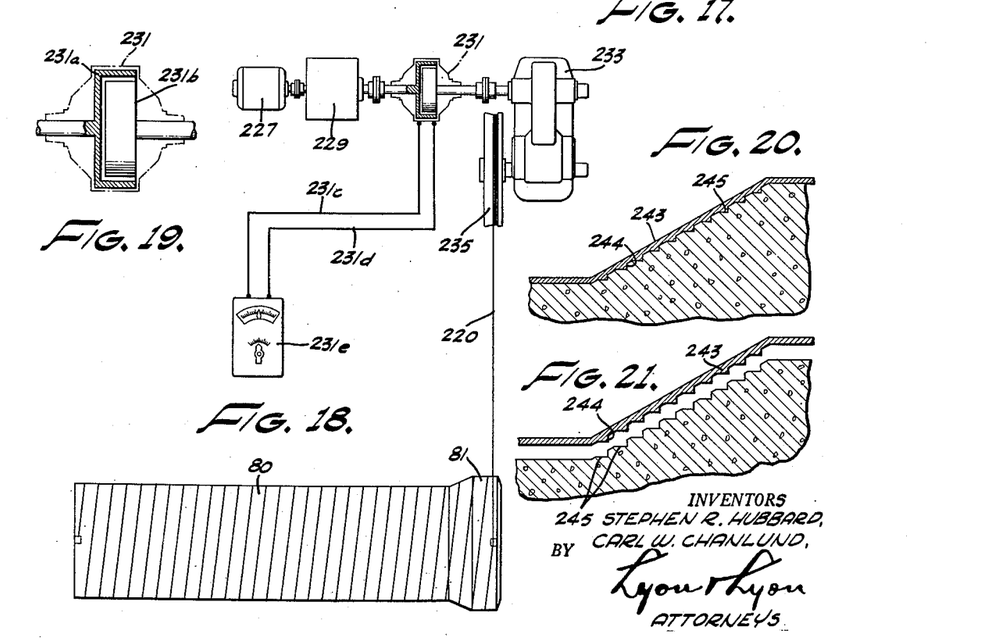
Figure 18 is a schematic diagram.
Figure 19 is a section of the clutch shown in Figure 18.
Figure 20 is a fragmentary section taken through the end of a pipe illustrating a process of forming the bell thereof according to an alternative method.
Figure 21 is a section similar to Figure 20 showing a further step in the alternative method.

In Figure 19, there is shown a schematic representation of the clutch 231 which is also representative of the clutch associated with the motor 38 and embodied in the motor housing. It will be noted in both cases that there is no direct connection between the two parts 231a and 231b and the coupling in the clutch is entirely electromagnetic, the field excitation being supplied through leads 231c and 231d (see Fig. 18) and controlled by a potentiometer 231e.

Figure 22:
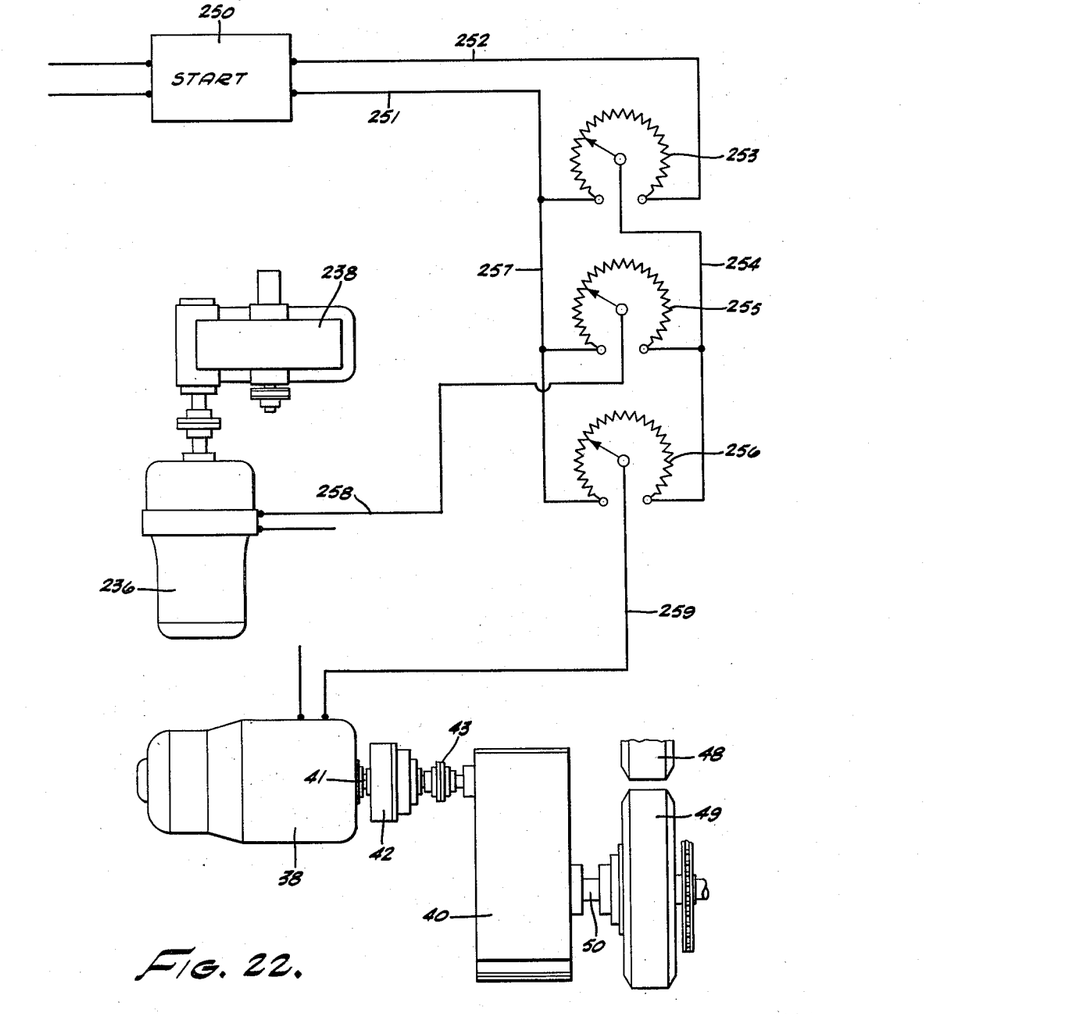
Figure 22 is a schematic wiring diagram of the controls associated with the eddy current clutches employed in connection with the pipe revolving motor and the cart driving motor.

Referring now more particularly to Figure 22, there is shown a schematic representation of the wiring diagram for the excitation of the eddy current clutches associated with the Adjusto-Spede motors 236 and 38. Any suitable source of electromotive power 250 is connected by conductor 251 and 252 to a first potentiometer 253. The wiper of said potentiometer is connected by conductor 254 to one side of potentiometer 255 and to one side of potentiometer 256. The other side of the potentiometer 253 is connected by conductor 257 to the other side of potentiometers 255 and 256 as indicated. The wiper of the potentiometer 255 is connected by conductor 258 to the motor 236 and the wiper of the potentiometer 256 is connected by conductor 259 to the motor 38. It will thus be seen that the potentiometer 253 serves to regulate the power being supplied to both motors 236 and 38 whereas the potentiometers 255 and 256 provide a power dividing means by means of which the amount of power being supplied to the motors 236 and 38 may be set at any desired ratio. Once the potentiometers 255 and 256 are set to divide the power being supplied at a given ratio, this ratio will be maintained despite any adjustment of the potentiometer 253.

While there has been described a method of cutting or grinding steps on the bell end 81 of the pipe in Figures 20 and 21, there is shown an alternative method in which during the casting of the pipe a mold 243 having spiral ridges 244 formed upon the interior thereof is used to cast the spiral steps 245 directly into the pipe during the formation thereof so as to eliminate the necessity of using the grinder or saw 168.

It will be apparent from the foregoing description that by means of the above described device, the pipe is rotated at a speed under the control of the operator by means of controlling the excitation of the clutch associated with the motor 38 so as to rotate the trunnions 48 and 49 at the desired speed. The control of this clutch gives an automatic control of the clutch associated with the motor 236 and the cart 213 is thus advanced at a rate directly proportional to the rate of turning of the pipe 80. It is also noted that by control of the potentiometer 255, which controls the excitation of a clutch associated with the motor 236, this proportion can be changed so that the speed of the cart 213 can be adjusted at will to vary the wire pitch independently of the speed of the trunnions 48 and 49, and vice versa. It is further noted that tension on the wire 220 is dependent upon excitation of the clutch 231 and thus can be independently controlled by the adjustment of the potentiometer 231e. By this means any desired spacing of the wire and any desired tensioning of the wire can be obtained. Moreover, it will be obvious that the pitch of the wire windings on the pipe 80 can be varied at will simply by adjusting either the potentiometers 255 or 256 and this can be done while the pipe is rotating.

While the invention has been described and is useful in connection with the prestressing of concrete pipe and the wrapping thereof with steel wire under tension, it will be understood that the invention can be utilized for the wrapping of any desired object of any shape or size and that due to the fact that the tension on the wire is independent of the rate of pull placed upon the wire and is dependent solely upon the excitation of the eddy current clutch 231, a uniformly tensioned wire can be wound upon such objects as triangular shaped devices and the like, and the term "pipe" as utilized herein includes as an equivalent any such device on which it is desired to wind a wire under tension.

While there has been described what is at present considered a preferred embodiment of the present invention, it will be appreciated by those skilled in the art that various changes and modifications can be made therein without departing from the essence of the invention, and it is intended to cover herein all such changes and modifications as come within the true spirit and scope of the appended claims.

We claim:
1. A machine for applying wire under tension to a pipe comprising: spaced wheels for supporting and rotating the pipe, rotating means for driving said wheels, a first electrically actuated adjustable control means connected to the rotating means adapted to set the speed thereof at a selected rate, means for supplying a wire under tension to said pipe to be wound thereon, wire moving means for moving said wire axially with respect to said pipe so as to impart a pitch to said wire as it is wound on said pipe, a second electrically actuated adjustable control means connected to said wire moving means adapted to set the speed thereof at a selected rate, a source of electric power common to the controls for both said rotating means and said wire moving means whereby to maintain a preselected ratio between said driving means and said wire moving means determined by the settings of said control means, and adjustable power dividing means having an inlet end connected to said source of power and an outlet end connected to the controls respectively for said rotating means and the wire moving means, said power dividing means being thereby adapted to controllably alter the speed of operation without altering said ratio.

2. A machine as set forth in claim 1 including a tensioner in said supply means adapted to engage said wire to maintain a constant tension thereon and in which said wire tensioning means includes a capstan, a shaft turned in one direction by said capstan as wire is unreeled therefrom, and an eddy current clutch connected with said shaft having clutch elements spaced at a fixed distance one from another, coils on said clutch elements and a supply of electricity to said coils thereby to determine the resistance of one clutch element to rotation of the other thereby to maintain torque on said shaft in the opposite direction.

3. A machine as set forth in claim 1 including wire tensioning means comprising a capstan, a shaft turned in one direction by said capstan as wire is unreeled therefrom, an eddy current clutch including a member connected with said shaft having clutch elements at a fixed spaced distance from each other, electric coils on said elements adapted when energized to maintain torque on said shaft in the opposite direction, an electric power supply to said eddy current clutch, and a potentiometer in said power supply for variably controlling said power thereby to variably control the tension on said wire.

4. A device as set forth in claim 3 including an electromotor connected with said eddy current clutch having said one clutch member spaced at a fixed distance from another clutch member, said motor being arranged to be driven in a direction to rotate the clutch element thereof adjacent the motor in the direction opposite to the rotation of the clutch element associated with said shaft for maintaining tension on said wire when said pipe is at rest.

5. A machine for applying wire under tension to a pipe comprising: spaced wheels for supporting and rotating the pipe, rotating means for driving said wheels, a first electrically actuated adjustable control means connected to the rotating means adapted to set the speed thereof at a selected rate, supply means for delivering a wire to said pipe to be wound thereon, wire moving means for moving said wire axially with respect to said pipe so as to impart a pitch to said wire as it is wound on said pipe, a second electrically actuated adjustable control means connected to said wire moving means adapted to set the speed thereof at a selected rate, a source of electric power common to the controls for said rotating means and said wire moving means whereby to maintain a preselected ratio between said driving means and said wire moving means determined by the settings of said control means, an adjustable power divider having an inlet end connected to the source of power and an outlet end connected to both controls and thereby adapted to controllably alter the speed of operation without altering said ratio, and a tensioner in said supply means adapted to engage said wire whereby to maintain a constant tension on said wire as it is wound on the pipe, said tensioner including a resistance means moving in a direction against the movement of wire to the pipe whereby to maintain tension when the pipe is at rest.

6. A machine for applying wire under tension to a pipe comprising: spaced wheels for supporting and rotating the pipe, rotating means for driving said wheels, a first electrically actuated adjustable control means connected to the rotating means adapted to set the speed thereof at a selected rate, supply means for delivering a wire to said pipe to be wound thereon, wire moving means for moving said wire axially with respect to said pipe so as to impart a pitch to said wire as it is wrapped on said pipe, a second electrically actuated adjustable control means connected to said wire moving means adapted to set the speed thereof at a selected rate, a source of electric power common to the controls for said rotating means and said wire moving means whereby to maintain a preselected ratio between said driving means and said wire moving means determined by the settings of said control means, an adjustable power divider having an inlet end connected to the source of power and an outlet end connected to both controls adapted to controllably alter the speed without altering said ratio, and a tensioner in said supply means adapted to engage said wire whereby to maintain a constant tension on said wire as it is wound on the pipe, said tensioner including a resistance means moving in a direction against the movement of wire to the pipe whereby to maintain tension when the pipe is at rest, and a variable adjusting means for said resistance means adapted to enable varying the tension on the wire while the pipe is in rotation and while at rest.

7. A pipe wrapping machine comprising: spaced wheels for supporting and rotating the pipe, means for driving said wheels, means for supplying a wire under tension to said pipe to be wrapped thereon, means for moving said wire axially with respect to said pipe so as to impart a pitch to said wire as it is wrapped on said pipe, means for establishing a constant predetermined speed ratio between said driving means and said wire moving means, said supplying means comprising a cart spaced from said pipe and movable longitudinally thereof on rotation of said pipe, said means for driving said wheels comprising an electromotor having an output shaft and an eddy current clutch for controlling the speed of said output shaft, said wire moving means comprising an electromotor having an output shaft and an eddy current clutch for controlling the speed of its output shaft for moving said cart, a source of electric power common to said clutches, power dividing means between said source of power and the respective clutches, one of said clutches being arranged in cascade relation to the other of said clutches with one of said clutches as the master and the other of said clutches as the slave, whereby the speed of said one motor output shaft and the speed of the other motor shaft are maintained at said predetermined ratio.

8. A machine for winding wire under tension upon a pipe comprising: a frame, spaced sets of wheels on the frame for supporting and rotating the pipe, driving means for rotating said wheels, supplying means for delivering a wire under tension to said pipe to be wound thereon, wire moving means for advancing said wire axially with respect to said pipe so as to impart a pitch to said wire as it is wrapped on said pipe, and a power supply, said wire supplying means comprising a cart movably mounted on the frame in a position spaced from said pipe and movable longitudinally thereof on rotation of said pipe, said driving means comprising an electromotor having an output shaft and an eddy current clutch for controlling the speed of said output shaft, said wire moving means comprising an electromotor on the cart having an output shaft and an eddy current clutch for controlling the speed of its output shaft for moving said cart, one of said clutches being arranged in cascade relation to the other of said clutches with said one clutch as the master and said other clutch as the slave, whereby the speed of said one motor output shaft and the speed of the other motor output shaft are maintained at a constant predetermined ratio, and adjustable means for controllably altering setting of said speed ratio as desired.

9. A machine as set forth in claim 8 in which said adjustable means for controllably altering the setting of said speed ratio of said motor output shafts comprises variable potentiometers arranged to divide the power supply to said eddy current clutches.

10. A machine for winding wire under tension upon a pipe comprising: a frame, sets of spaced wheels on the frame for supporting and rotating the pipe, drive means for rotating said wheels, supplying means for delivering a wire under tension to said pipe to be wound thereon, moving means for advancing said wire axially with respect to said pipe so as to impart a pitch to said wire as it is wound on said pipe, a power supply, said drive means comprising an electromotor having an output shaft and an eddy current clutch for controlling the speed of said output shaft, said wire moving means including an electromotor having an output shaft and an eddy current clutch for controlling the speed of its output shaft, said second clutch being arranged in cascade relation to said first clutch with said first clutch as the master and said second clutch as the slave, whereby the speed of said first motor output shaft and said second motor output shaft are maintained at a constant predetermined ratio.

11. A pipe wrapping machine comprising: a frame, sets of spaced wheels on the frame for supporting and rotating the pipe, means for rotating said wheels, means for supplying a wire under tension to said pipe to be wrapped thereon, means for advancing said wire axially with respect to said pipe so as to impart a pitch to said wire as it is wrapped on said pipe, a power supply, means for maintaining a constant preselected ratio between said rotating means and said wire advancing means, said means for rotating said wheels comprising an electromotor on the frame having an output shaft and an eddy current clutch for controlling the speed of said output shaft, said wire moving means including an electromotor on the cart having an output shaft and an eddy current clutch for controlling the speed of its output shaft, said second clutch being arranged in cascade relation to said first clutch with said first clutch as the master and said second clutch as the slave, whereby the speed of said first motor output shaft and said second motor output shaft are maintained at said constant preselected ratio, and adjustable means for controllably altering the speed without altering said ratio.

12. A machine as set forth in claim 11 in which said adjustable means for controllably altering said ratios and said speed comprise variable potentiometers arranged to divide the power supply to said clutches.

References Cited in the file of this patent

UNITED STATES PATENTS

| | | |
|---|---|---|
| 704,574 | Pintsch | July 15, 1902 |
| 1,356,226 | Severy | Oct. 19, 1920 |
| 2,242,435 | Parvin et al. | May 20, 1941 |
| 2,348,765 | Trickey et al. | May 16, 1944 |
| 2,469,706 | Winther | May 10, 1949 |
| 2,573,793 | Kennison | Nov. 6, 1951 |
| 2,601,961 | Stephenson | July 1, 1952 |
| 2,639,864 | Hale | May 26, 1953 |
| 2,643,068 | Harris | June 23, 1953 |
| 2,668,670 | Van Alen | Feb. 9, 1954 |

FOREIGN PATENTS

| | | |
|---|---|---|
| 835,177 | France | Sept. 19, 1938 |